(12) United States Patent
Lee et al.

(10) Patent No.: US 8,731,565 B2
(45) Date of Patent: May 20, 2014

(54) APPARATUS AND METHOD OF PERFORMING HANDOVER IN WIRELESS COMMUNICATION SYSTEM

(75) Inventors: Sung Min Lee, Anyang-si (KR); Sung Jun Park, Anyang-si (KR); Sung Hoon Jung, Anyang-si (KR); Sung Duck Chun, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 13/015,538

(22) Filed: Jan. 27, 2011

(65) Prior Publication Data

US 2011/0183676 A1   Jul. 28, 2011

Related U.S. Application Data

(60) Provisional application No. 61/298,873, filed on Jan. 27, 2010, provisional application No. 61/300,409, filed on Feb. 1, 2010.

(51) Int. Cl.
*H04W 36/00* (2009.01)
(52) U.S. Cl.
USPC ........ 455/444; 455/436; 455/439; 455/422.1; 370/331

(58) Field of Classification Search
CPC ..... H04W 36/00; H04W 36/08; H04W 36/16; H04W 36/18; H04W 16/32; H04W 16/08; H04W 16/16
USPC ........................................................ 455/444
See application file for complete search history.

(56) References Cited

U.S. PATENT DOCUMENTS

2009/0047960 A1 * 2/2009 Gunnarsson et al. ......... 455/436
2012/0115459 A1 * 5/2012 Deng et al. ................. 455/422.1

* cited by examiner

*Primary Examiner* — Wayne Cai
*Assistant Examiner* — Chuck Huynh
(74) *Attorney, Agent, or Firm* — Lee, Hong, Degerman, Kang & Waimey

(57) ABSTRACT

A method and apparatus of performing a handover from a macro cell to a closed subscriber group (CSG) cell in a wireless communication system is provided. A user equipment transmits to a macro cell proxy information which indicates at least one frequency for at least one member CSG cell and receives from the macro cell a handover command which commands a handover from the macro cell to a target CSG cell. The user equipment performs the handover from the macro cell to the target CSG cell and checks whether additional proxy information indicating an additional frequency for at least one additional member CSG cell during the handover is found. The user equipment transmits to the target CSG cell the additional proxy information after completing the handover.

12 Claims, 13 Drawing Sheets

APPARATUS AND METHOD OF PERFORMING HANDOVER IN WIRELESS COMMUNICATION SYSTEM

CROSS-REFERENCE TO RELATED APPLICATIONS

Pursuant to 35 U.S.C. §119(e), this application claims the benefit of earlier filing date and right of priority to U.S. Provisional Application Ser. No. 61/298,873, filed on Jan. 27, 2010, and 61/300,409, filed on Feb. 1, 2010, the contents of which are hereby incorporated by reference herein in their entirety.

BACKGROUND OF THE INVENTION

1. Field of the Invention

The present invention relates to wireless communications, and more particularly, to a method and apparatus for handover in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A closed subscriber group (CSG) is introduced to provide better quality of service by allowing limited access only to a specific subscriber. A base station capable of providing a CSG service is referred to as a home eNodeB (HNB), and a cell providing a licensed service to subscribers of the CSG is referred to as a CSG cell. Basic requirements of the CSG in 3GPP are disclosed in 3GPP TS 22.220 V1.0.1 (2008-12) "Service requirements for Home NodeBs and Home eNodeBs (Release 9)".

A handover to a CSG cell is called inbound mobility. In order for a user equipment (UE) to further effectively perform the handover to the CSG cell, the UE and a network share proxy information. For the inbound mobility, the UE sends to the network the proxy information for reporting that a member CSG cell to which the UE belongs as a member exists nearby.

The UE and the network share the same proxy information always. Therefore, if the proxy information changes, the changed proxy information needs to be sent by the UE to the network.

When a serving cell changes due to the handover, the UE retransmits all of the old proxy information to a new serving cell. However, many radio resources may be required to retransmit all of the old proxy information.

SUMMARY OF THE INVENTION

The present invention provides a method and apparatus for performing a handover from a macro cell to a closed subscriber group (CSG) cell in a wireless communication system.

In an aspect, a method of performing a handover from a macro cell to a closed subscriber group (CSG) cell in a wireless communication system is provided. The method includes transmitting, by a user equipment to a macro cell, proxy information which indicates at least one frequency for at least one member CSG cell, receiving, by the user equipment from the macro cell, a handover command which commands a handover from the macro cell to a target CSG cell, performing, by the user equipment, the handover from the macro cell to the target CSG cell, checking, by the user equipment, whether additional proxy information indicating an additional frequency for at least one additional member CSG cell during the handover is found, and transmitting, by the user equipment to the target CSG cell, the additional proxy information after completing the handover.

The additional proxy information can be found if a measurement object for the additional frequency is not matched with at least one measurement object included in the handover command.

The additional proxy information can be found if a proxy identifier for the additional frequency is not matched with at least one proxy identifier included in the handover command.

The proxy information may include at least one proxy identifier to identify the proxy information.

The method may further include transmitting, by the user equipment to the macro cell, a measurement report which includes a measurement result of the at least one member CSG cell and an identity of the at least one member CSG cell.

In another aspect, an apparatus of performing a handover from a macro cell to a closed subscriber group (CSG) cell in a wireless communication system is provided. The apparatus includes a radio frequency unit configured for receiving and transmitting radio signals, and a processor operatively coupled with the radio frequency unit and configured for transmitting, to a macro cell, proxy information which indicates at least one frequency for at least one member CSG cell, receiving, from the macro cell, a handover command which commands a handover from the macro cell to a target CSG cell, performing, the handover from the macro cell to the target CSG cell, checking whether additional proxy information indicating an additional frequency for at least one additional member CSG cell during the handover is found, and transmitting, to the target CSG cell, the additional proxy information after completing the handover.

DESCRIPTION OF EXEMPLARY EMBODIMENTS

Figure 1:
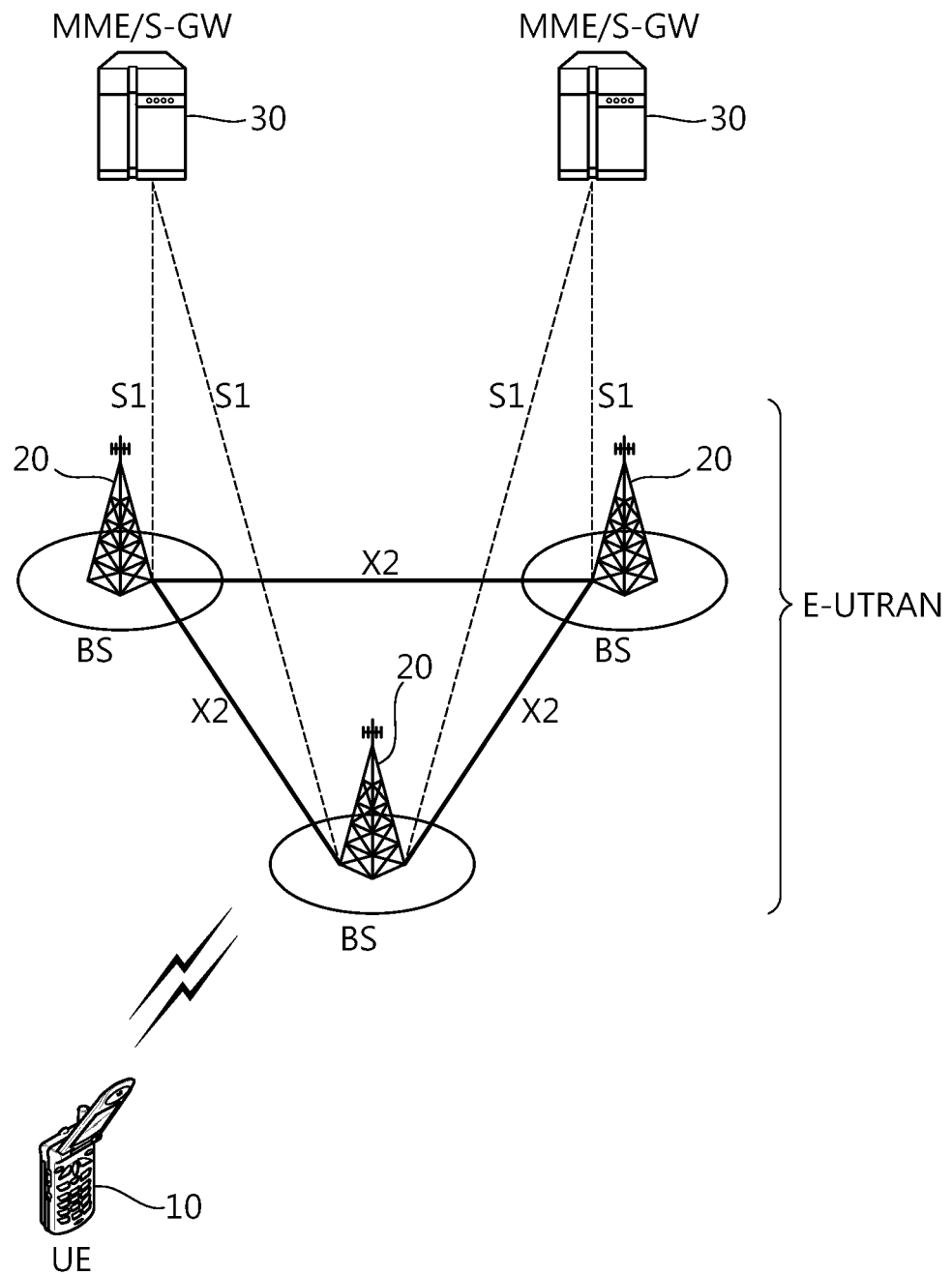
FIG. 1 shows a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
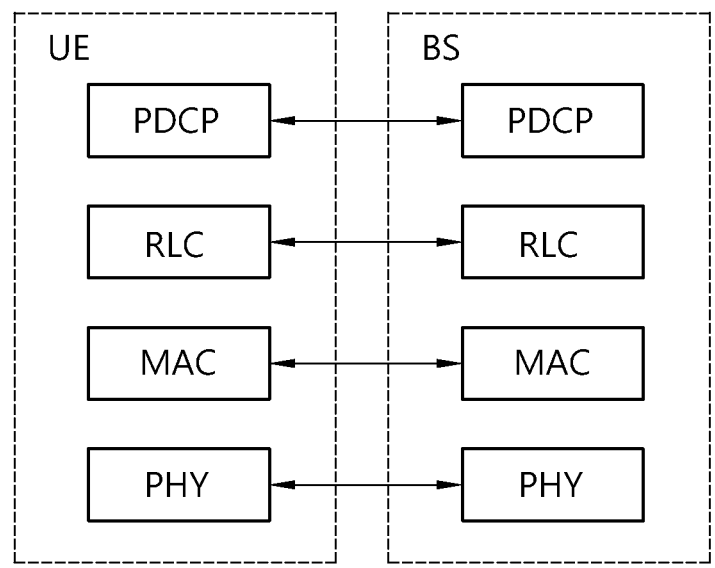
FIG. 2 is a diagram illustrating a radio protocol architecture for a user plane.
Figure 3:
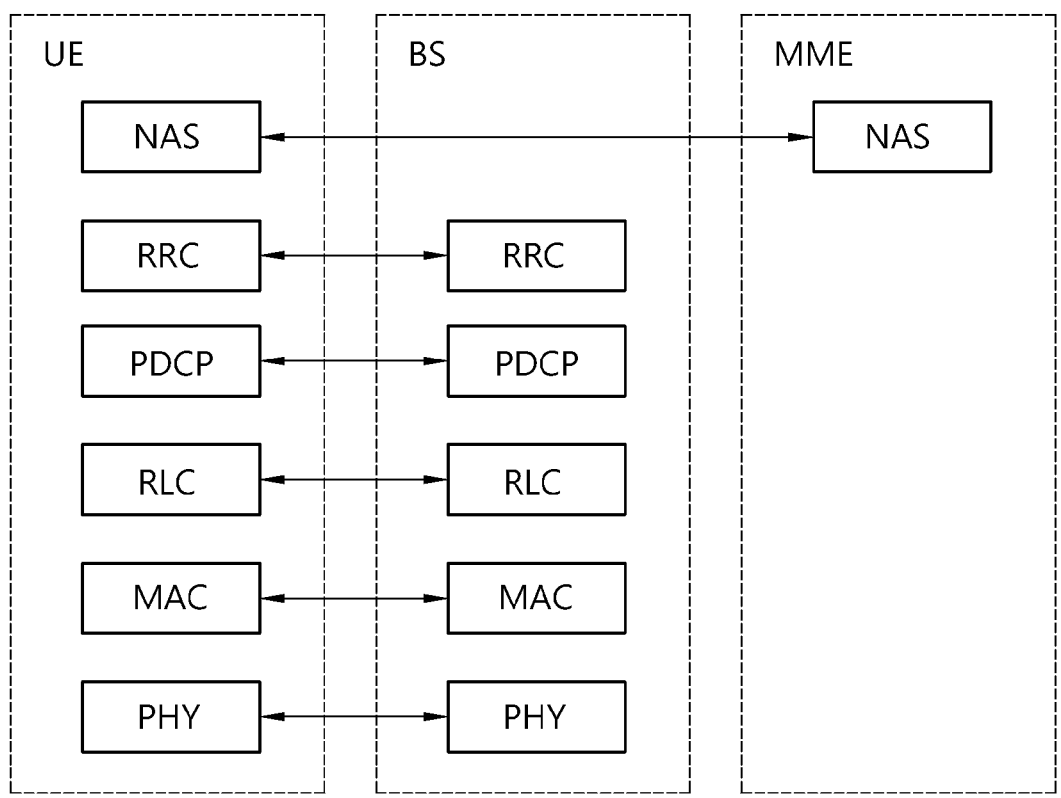
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
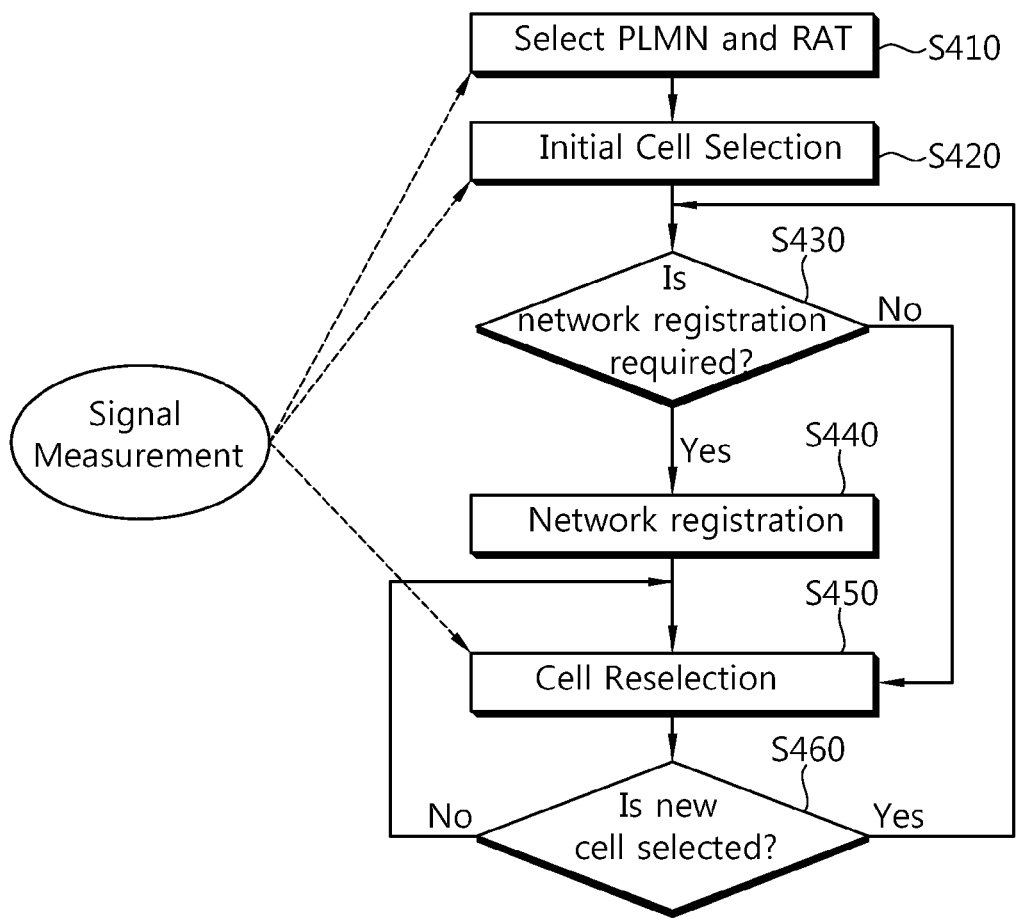
FIG. 4 is a diagram illustrating an operation of a UE selecting a cell in an idle mode.

FIG. 4 is a diagram illustrating an operation of a UE selecting a cell in an idle mode.

The UE selects a Radio Access Technology (RAT) for communicating with a Public Land Mobile Network (PLMN) from which the UE itself desires to receive a service (S410). The information of PLMN and RAT may be selected by the user of the UE, and what is stored in the USIM may be also used.

The UE selects a cell having the largest value among the cells that the measured base station has a value greater than a particular value in the signal intensity and quality (S420). Then, it receives system information being sent by the base station. The particular value denotes a value defined by a system to guarantee the quality of physical signals in the data transmission and/or reception. Accordingly, the value may vary based on the RAT to be applied.

If a network registration is required, the UE registers its own information (for example, IMSI) for receiving a service (for example, paging) from a network (S430, S440). The UE is not registered into a network to be accessed whenever selecting a cell. For example, system information (for example, Tracking Area Identity (TAI)) of the network to be registered is different from network information that the UE itself knows.

If a value of the signal intensity and quality measured by the base station from which the UE receives a service is less than a value measured by the base station of the neighboring cell, then the UE selects one of the other cells providing signals having better characteristics than those of the cell of the base station being accessed by the UE (S450). This process is called a cell reselection to distinguish it from an initial cell selection in the step S420. At this time, a time restriction condition may be specified in order to prevent a cell from being frequently reselected based on the change of the signal characteristics.

Next, a procedure for selecting a cell by the UE will be described in detail.

If the UE is turned on or camps on a cell, the UE may perform procedures for selecting/reselecting a cell having a suitable quality in order to receive a service.

The UE in a RRC idle state needs to select a cell having a suitable quality all the time, and thus be prepared to receive a service through the cell. For example, the UE that has been just turned on selects a cell having a suitable quality to be registered into a network. If the UE that has been in a RRC connected state enters into an RRC idle state, then the UE should select a cell in which the UE itself is camped on. In this manner, a process of selecting a cell satisfying a predetermined condition by the UE in order to be camped in a service waiting state such as the RRC idle state, is called a cell selection. The cell selection is performed in a state that the UE does not currently determine a cell in which the UE itself is camped in the RRC idle state, and thus it is very important to select the cell as quickly as possible. Therefore, if it is a cell providing a radio signal quality greater than a predetermined level, then it may be selected during a cell selection process by the UE even though the cell is not a cell providing best radio signal quality.

Hereinafter, by referring to the disclosure 3GPP TS 36.304 V8.5.0 (2009-03) "User Equipment (UE) procedures in idle mode (Release 8)", a method and procedure for selecting a cell by a UE will be described in detail.

If power is initially turned on, the UE searches for available PLMNs and selects a suitable PLMN to receive a service. Subsequently, the UE selects a cell having a signal quality and characteristic capable of receiving a suitable service among the cells being provided by the selected PLMN.

The cell selection process can be classified into two types.

One type is an initial cell selection process, and in this process, the UE does not have previous information on radio channels. Therefore, the UE searches for all the radio channels to find a suitable cell. In each channel, the UE searches for the strongest cell. Subsequently, if a suitable cell satisfying the cell selection criteria is found, then the UE selects the corresponding cell.

The other type is a cell selection process using the stored information, and in this process, the UE uses information on radio channel stored in the UE, or selects a cell by using information being broadcasted from the cell. Accordingly, a cell may be quickly selected compared to an initial cell selection process. If a cell satisfying the cell selection criteria is found, then the UE selects the corresponding cell. If a cell satisfying the cell selection criteria is not found, then the UE performs an initial cell selection process.

The cell selection criteria used by the UE in the cell selection process may be represented as follows:

$$Srxlev > 0 \quad \text{[Equation 1]}$$

where $Srxlev = Qrxlevmeas - (Qrxlevmin + Qrxlevminoffset) - Pcompensation$, Qrxlevmeas denotes a measured cell received level (RSRP), Qrxlevmin denotes a minimum required received level in the cell (dBm), Qrxlevminoffset denotes a offset to Qrxlevmin, $Pcompensation = \max(PEMAX - PUMAX, 0)$ (dB), PEMAX denotes a maximum transmission power allowed for the UE in the corresponding cell (dBm), and PUMAX denotes a maximum transmission power of the UE radio transmission unit based on the performance of the UE (dBm).

In the above Equation 1, it may be seen that UE selects a cell having a value of the measured signal intensity and quality greater than a particular value specified by the cell providing a service. Furthermore, the parameters used in the above Equation 1 are broadcast via the system information, and the UE receives those parameter values to use them for the cell selection criteria.

If the UE selects a cell satisfying the cell selection criteria, then the UE receives the information required for the RRC idle state operation of the UE in the corresponding cell from the system information of the corresponding cell. The UE receives all the information required for operation for the RRC idle state, and then waits in an idle mode to request a service (for example, originating call) to a network or receive a service (for example, terminating call) from a network.

After the UE selects a certain cell via a cell selection process, the signal intensity and quality between the UE and the base station may be changed due to the change of the UE mobility and wireless environment. Therefore, if the quality of the selected cell is deteriorated, then the UE may select another cell providing better quality. In this manner, if a cell is reselected, then a cell providing signal quality better than that of a currently selected cell is typically selected. This process is called a cell reselection. A basic object of the cell reselection process is typically to select a cell providing best quality to the UE from a standpoint of the radio signal quality.

In addition to the standpoint of the radio signal quality, the network may notify the UE of its priority by determining it for each frequency. The UE that has received the priority may consider this priority in the first place than the radio signal quality criteria during the cell reselection process.

As described above, there is a method of selecting or reselecting a cell based on the signal characteristics of wireless environment. When reselecting a cell, in selecting a cell for the reselection, there may be cell reselection methods as described below, based on the RAT and frequency characteristics of a cell.

Intra-frequency cell reselection: A cell having a center-frequency similar to the RAT of the cell currently being used by the UE is reselected.

Inter-frequency cell reselection: A cell having a center-frequency different from the RAT of the cell currently being used by the UE is reselected.

Inter-RAT cell reselection: A cell using a different RAT from the RAT currently being used by the UE is reselected.

The principles of cell reselection are as follows.

First, a UE may measure the quality of a serving cell and/or the quality of a neighboring cell for cell reselection.

Second, the cell reselection may be performed based on cell reselection criteria. The cell reselection criteria have following characteristics with regard to the measurement of cells.

Intra-frequency cell reselection may be performed based on the rankings of cells. The rankings may be a procedure to define a ranking criterion and to order the cells based on the ranking criterion. A highest-ranking cell is referred to as a best-ranked cell. A ranking value may be a measured result provided by a UE or may be the adjusted value of applying a frequency offset or cell offset to the measured result.

Inter-frequency cell reselection may be performed based on the priorities of frequencies which are provided by a BS. A UE may attempt to camp on a cell at a frequency with a highest priority. A network may provide frequency priorities to UEs via broadcast signaling or via dedicated signaling.

For inter-frequency cell reselection, a network may provide parameters (e.g., frequency-specific offsets) for use in cell reselection to each UE.

For intra- or inter-frequency cell reselection, a network may provide a neighboring cell list (NCL) for use in cell reselection to each UE. The NCL may include cell-specific parameters (e.g. cell-specific offsets).

For intra- or inter-frequency cell reselection, a network may provide a blacklist including a number of cells that should not be reselected to each UE. The cells included in the blacklist may not be subjected to cell reselection.

The rankings of cells will hereinafter be described in further detail.

A ranking criterion for ranking cells may be defined as follows:

$$Rs = Q\text{meas},s + Q\text{hyst}, Rn = Q\text{meas},n - Q\text{offset} \quad \text{[Equation 2]}$$

where Rs indicates a ranking value of a serving cell, Rn indicates a ranking value of a neighboring cell, Qmeas,s indicates the quality of the serving cell measured by a UE, Qmeas,n indicates the quality of the neighboring cell measured by the UE, Qhyst indicates a hysteresis value for ranking, and Qoffset indicates an offset between two cellsl.

In intra-frequency cell reselection, if a UE receives an offset Qoffsets,n between the serving cell and the neighboring cell, Qffoset=Qoffsets,n. Otherwise, Qffoset=0.

In inter-frequency cell reselection, if the UE receives the offset Qoffsets,n, Qoffset=Qoffsets,n+Qfrequency. Otherwise, Qoffset=Qfrequency.

If the ranking values of the serving cell and the neighboring cell are not much different from each other and constantly vary, the rankings of the serving cell and the neighboring cell may change frequently. Thus, the serving cell and the neighboring cell may be alternately selected as a new serving cell too often. In order to address this problem, the hysteresis value Qhyst may be used.

A UE may determine the rankings of the serving cell and the neighboring cell using Equation (2), may determine whichever of the serving cell and the neighboring cell has a higher ranking value than the other cell as a best-ranked cell, and may select the best-ranked cell as a new serving cell.

In the above-mentioned cell reselection criterion, the quality of cells is considered as most important factor when performing cell reselection. If a reselected cell is not a suitable cell, a UE may exclude the reselected cell or the frequency of the reselected cell.

Now, speed scaling having an effect on cell reselection depending on a moving speed of a UE will be described.

When the UE passes cells at a fast speed, there may be a case where cell reselection is not correctly performed and the UE is unable to camp on a specific cell. This problem is caused by a reselection time (i.e., Treselection) for preventing unnecessary cell reselection.

If neighboring cell's signal strength measured by the UE during the Treselection is greater than a specific value, cell reselection is performed, and if the moving speed of the UE is fast, there is a case where a cell reselection condition cannot be satisfied by using the existing Treselection. Therefore, if the moving speed of the UE changes, the Treselection is decreased so that the cell reselection condition is satisfied in a fast moving speed, which is referred to as speed scaling. The speed change of the UE is determined by comparing the number of cell reselections during a specific time period with a specific value.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG. However, those services may be provided to other users in addition to the CSG based on the operation mode setting of the HNB.

Figure 5:
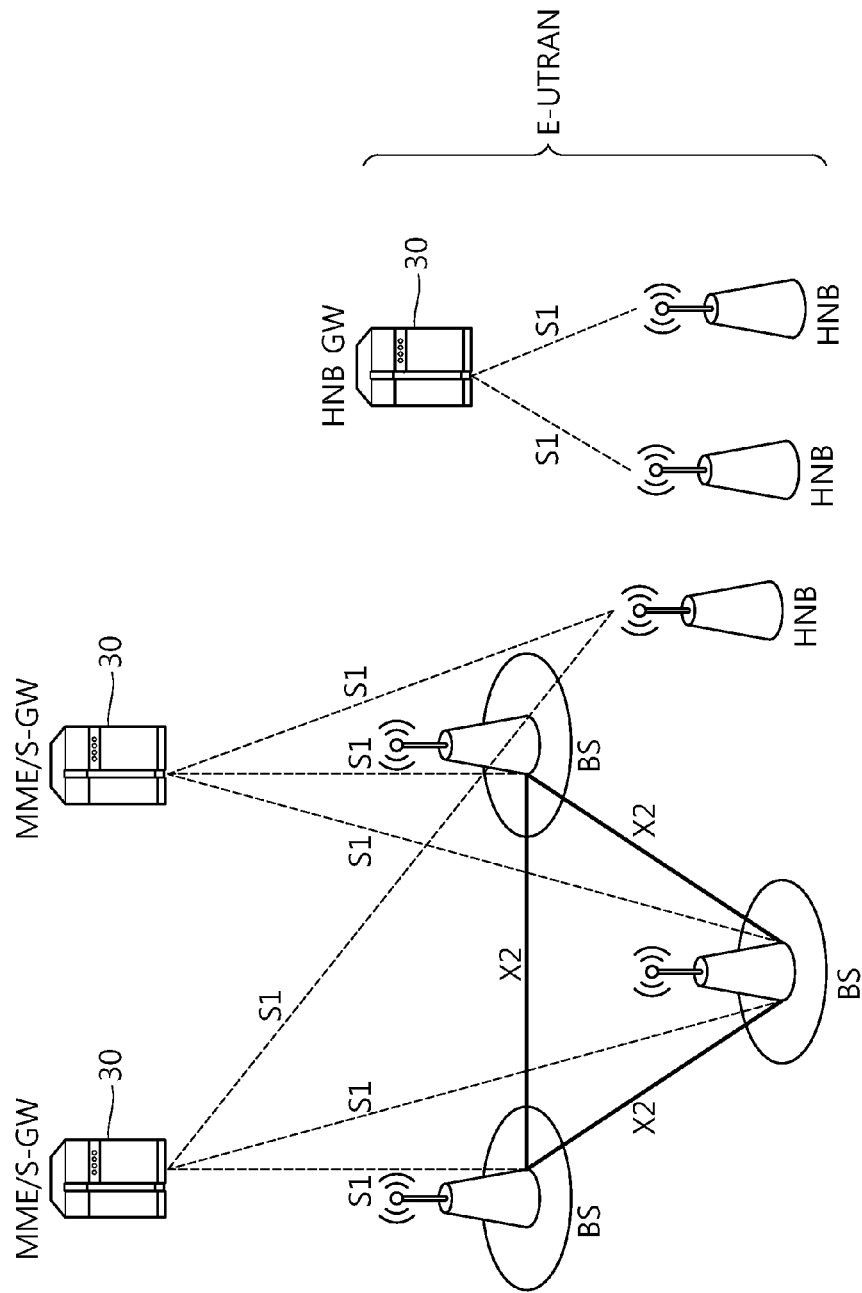
FIG. 5 is an exemplary view illustrating a network architecture for managing an HNB by using an HNB gateway.

FIG. 5 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG.

A UE has a list of CSGs to which the UE belongs as a member. This list is called as a CSG white list.

HNB delivers the CSG ID of the CSG being supported by itself through the system information, thereby allowing only the corresponding CSG member UE to be accessed. When a CSG cell is found by the UE, what type of CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
|---|---|---|
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
|---|---|---|
| UE not supporting CSG | Access denied | Access accepted |
| Non-CSG member UE | Access denied | Access accepted |
| CSG member UE | Access accepted | Access accepted |

Figure 6:
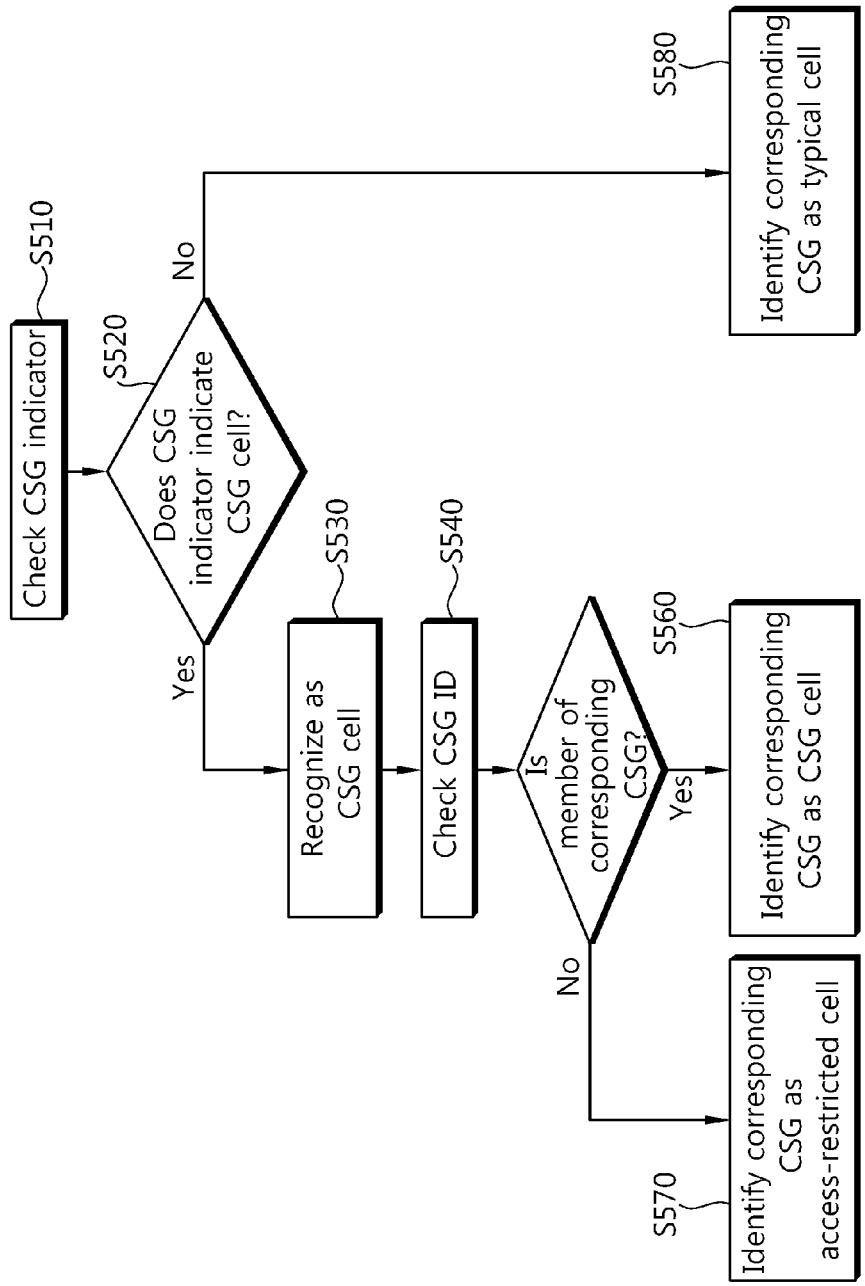
FIG. 6 is a flowchart illustrating a method of checking the access mode of a base station by a UE.

FIG. 6 is a flowchart illustrating a method of checking the access mode of a base station by a UE.

The UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information. The UE that received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency, it may be known that the corresponding cell is a CSG cell if only a cell having the PCI reserved for CSG is found, instead of individually checking the CSG identity of the system information of every cell found in the whole PCI range.

It will hereinafter be described how to perform cell reselection related to a CSG cell.

A CSG cell is a cell for providing better-quality services, i.e., CSG services, to its member UEs. Since UE may be typically serviced with better Quality of Service (QoS) in a CSG cell than in non-CSG cell, when a UE camps on the CSG cell, the selection of another cell may not be appropriate in terms of QoS even if an inter-frequency of a higher priority than a serving frequency is found.

In order to prevent a cell at an inter-frequency of a higher priority than a serving frequency from being selected over a serving CSG cell during reselection process, a UE may assume the serving frequency to have the highest priority of all other frequencies as long as the serving CSG cell is evaluated as the best-ranked cell on the corresponding frequency.

In order to encourage a UE to reselect a CSG cell at inter-frequency other than non-CSG cell at intra/inter-frequency regardless of a frequency priority of the CSG cell, the UE may assume that the frequency of the CSG cell to have the highest priority of all other frequencies as long as the CSG cell is evaluated as the best ranked cell on the corresponding frequency.

When the UE gives the highest priority to a specific frequency without any explicit network signaling, this frequency priority may be called as 'implicit highest priority'. In this manner, it is possible to help the UE camp on the CSG cell as much as possible without violating the existing cell reselection rule that cell reselection is performed based on the priorities of frequencies.

Figure 7:
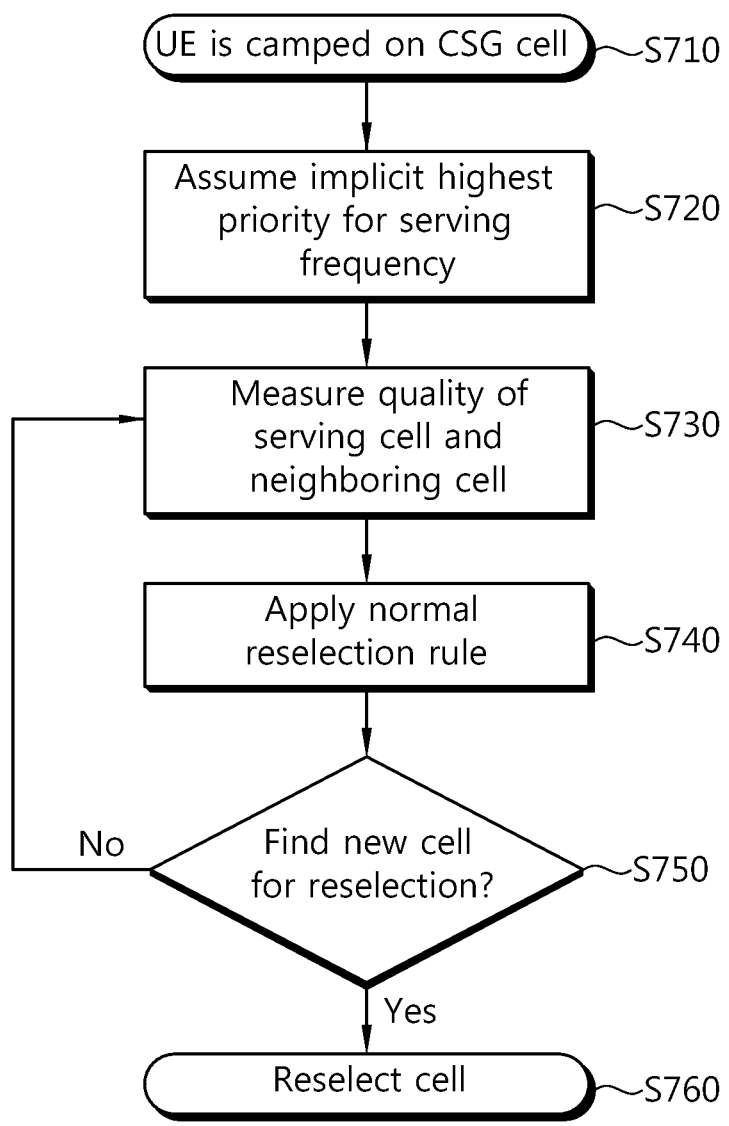
FIG. 7 illustrates a conventional cell reselection method.

FIG. 7 illustrates a conventional cell reselection method.

A UE camps on a CSG cell (S710).

Since a serving cell of the UE is the CSG cell, an implicit highest priority may be assigned to a serving frequency (S720).

The UE may measure the quality of the serving CSG cell and a neighboring cell (S730).

The UE may apply a normal reselection rule based on the measurement results performed in step S730 (S740). More specifically, the UE may search a best ranked cell in a frequency of a higher priority than the serving frequency. If no best-ranked cell is found from the frequency of a higher priority than the serving frequency, the UE may search the best ranked cell in a frequency having the same priority as that of the serving frequency. If no best-ranked cell is found from the frequency having the same priority as that of the serving frequency, the UE may search the best ranked cell in a frequency of a lower priority than the serving frequency.

If a new cell is found (S750), the UE may reselect the new cell (S760).

If the reselected cell is a non-CSG cell, the UE may withdraw the implicit highest priority assigned to the serving CSG cell, and may use frequency priorities provided by a network for cell reselection.

If the UE finds a new best-ranked CSG cell from a frequency having the same priority as that of the serving frequency, the UE may decide whether to stay in the current serving CSG cell or reselect the new best-ranked CSG cell.

Now, inbound mobility will be described. The inbound mobility is a handover from a macro cell to a CSG cell.

For the inbound mobility, there are two issues to be considered in comparison with the conventional handover from one macro cell to another macro cell. The first issue is PCI confusion, and the second issue is preliminary access check.

The PCI confusion is caused when one or more CSG cells and/or macro cells share the same PCI due to PCI shortage in a case where many CSG cells are installed. For example, the number of PCIs is limited to 504 in the 3GPP LTE. In general, cell planning may be used to allocate non-overlapping PCIs to respective macro cells. However, when one or more CSG cells are additionally deployed in a macro cell area, the conventional number of PCIs may be not enough to allocate different PCIs to all cells. In addition, since the CSG cell can be deployed in any places unlike the macro cell, the network may not be able to manage the PCI.

Figure 8:
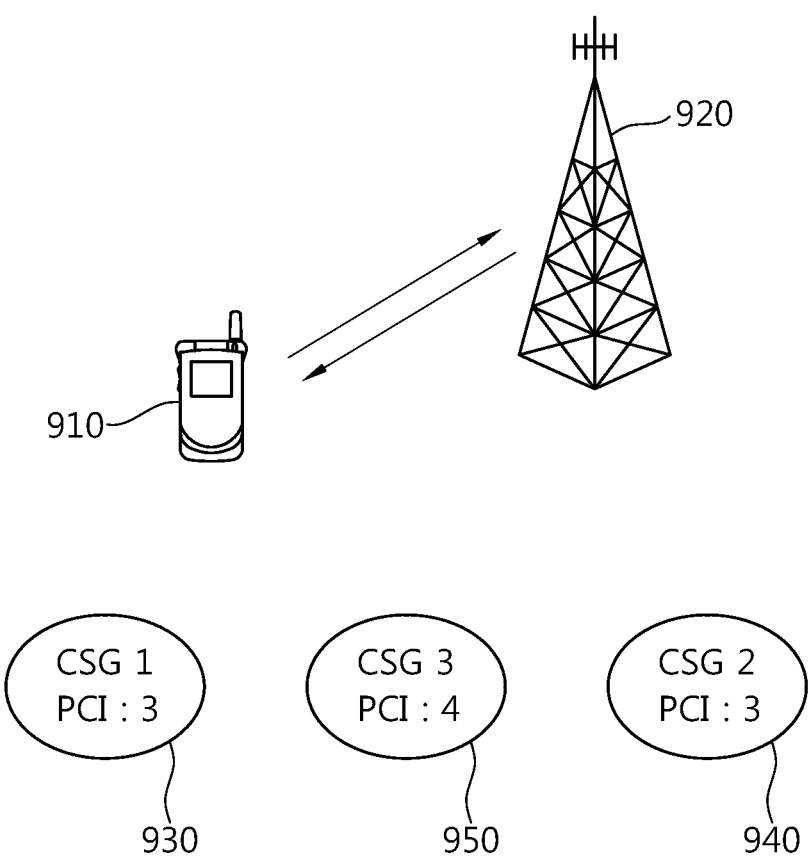
FIG. 8 shows an example of PCI confusion.

FIG. 8 shows an example of PCI confusion.

A UE 910 is in connection with a macro cell 920, and the macro cell 920 is a serving cell. It is assumed herein that a PCI of a CSG1 930 is 3, a PCI of a CSG2 940 is 3, and a PCI of a CSG3 950 is 4.

It is also assumed that the CSG1 930 has the best signal quality and thus the UE 910 desires to perform a handover to the CSG1 930. The UE 910 sends a measurement report message to the macro cell 920 by inserting the PCI of the CSG1 930 to the measurement report message.

However, since there is the CSG2 940 of which the PCI is 3, it becomes unclear to which CSG cell the macro cell 920 will send a handover request. This is referred to as PCI confusion. If the macro cell 920 sends the handover request to the CSG2 940 other than the CSG1 930 desired by the UE 910, the handover may fail and service quality of the UE may deteriorate.

The preliminary access check is a process performed before the handover to pre-recognize whether the UE is a member or non-member of a CSG cell to which the UE intends to move.

The reason above is that, even if whether to perform the handover is generally determined based on signal quality of neighboring cells, the handover is possible only when the UE is a CSG member of the target CSG cell.

The UE has a CSG white list, but the CSG cell does not have a list of accessible UEs. Therefore, the UE needs to attain a CSG ID of the CSG cell before the handover is performed, so as to determine whether the UE is a member or a non-member. This is referred to as the preliminary access check.

Figure 9:
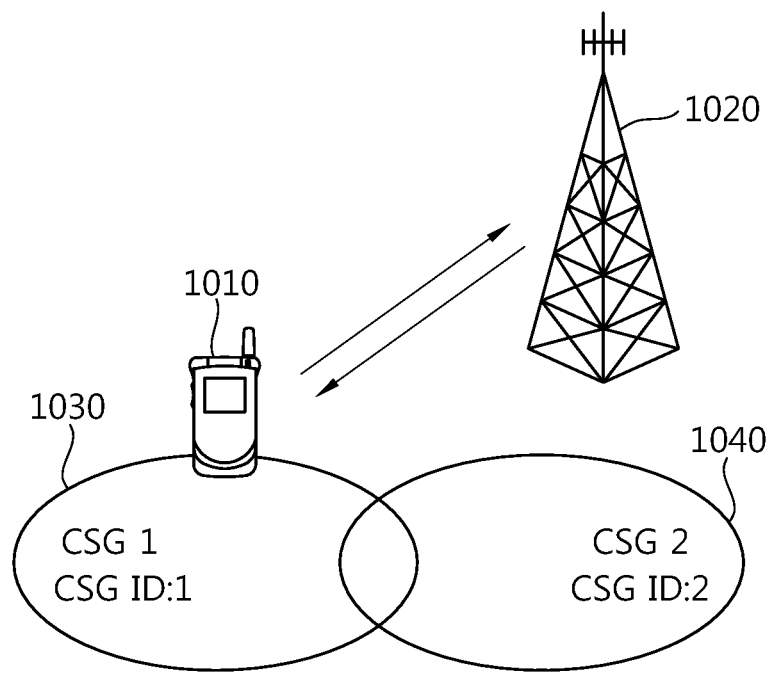
FIG. 9 shows a situation requiring the preliminary access check.

FIG. 9 shows a situation requiring the preliminary access check.

A UE 1010 is in connection with a macro cell 1020, and the macro cell 1020 is a serving cell. It is assumed herein that a CSG ID of a CSG1 1030 is 1 and a CSG ID of a CSG2 1040 is 2.

A CSG white list of the UE includes the CSG IDs 2 and 3. That is, the UE is a member of a CSG cell of which a CSG ID is 2 or 3.

Assume that the CSG1 1030 has the best signal quality. Therefore, when whether to perform a handover is determined only with signal quality, the UE 1010 requests the macro cell 1020 to perform a handover to the CSG1 1030. Then, the UE 1010 establishes a connection to the CSG1 1030 according to a handover command of the macro cell 1020. However, since the UE 1010 is not a CSG member of the CSG1 1030, access is denied. Therefore, the UE 1010 attempts cell selection or a handover to another cell, which leads to service delay.

In order to reduce a handover failure, the inbound mobility needs to consider the PCI confusion and the preliminary access check unlike in the conventional handover process. For this, the UE has to be able to read system information of a target cell before a handover and has to be able to send necessary information to a network.

Proxy information is used for the inbound mobility. The proxy information is information that indicates whether the UE is around at least one cell with which the UE is connected as a CSG member. In case of inter-frequency handover, proxy information related to one of more frequencies may be transmitted.

In general, the BS does not have a CSG white list of the UE. Therefore, the UE uses the proxy information to inform the BS that a previously visited member CSG cell exists nearby. Upon receiving the proxy information, the BS configures measurements on frequencies in the proxy information. The UE sends measurement reports for neighboring CGS cells. The BS commands the UE to send measurement reports including neighboring cell's identity (i.e., Global Cell ID) and CSG information (i.e. CSG membership and/or CSG ID) by using system information of the neighboring CSG cells. Accordingly, the BS can identify the target cell based the received neighboring cell's identity and can determine whether the target cell is a member CGS cell of the UE.

If the BS does not receive the proxy information, the BS does not configure the measurement on frequencies in which CSG cell exists. As a result, the UE cannot send measurement reports for neighboring CSG cells and the BS cannot know whether a CSG cell exists nearby and whether the CSG cell is a member CSG cell for the UE. Therefore, a situation may occur in which the BS is not capable of correctly sending a handover command to the UE.

The UE first provides the proxy information to the serving cell. After reading the system information of the neighboring CSG cell, the UE sends to the serving cell a measurement report including the neighboring CSG cell's identity and/or CSG ID. The serving cell may transmit to the UE a command indicating whether to receive the system information of the neighboring CSG cell and/or a measurement configuration for measuring the neighboring CSG cell.

Only when the BS knows correct proxy information, the BS can inform the UE whether a handover to the CSG cell will be performed, and the inbound mobility can be successfully performed through quality measurement.

Figure 10:
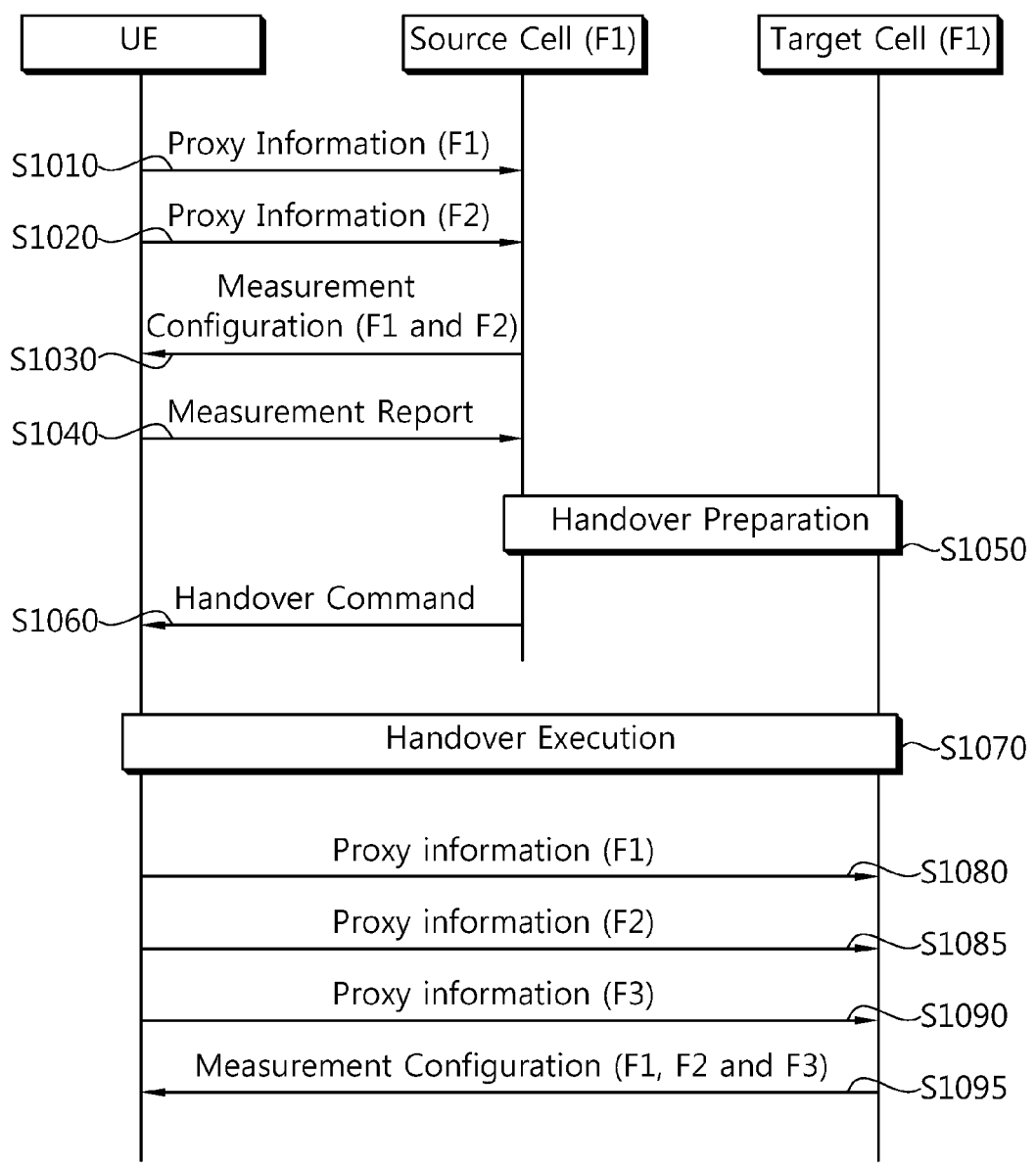
FIG. 10 is a flowchart showing a problem of the conventional inbound mobility.

FIG. 10 is a flowchart showing a problem of the conventional inbound mobility. It is assumed that a serving cell and a target cell use the same frequency F1, a source cell is a macro cell, and the target cell is a CSG cell.

A UE transmits proxy information regarding the frequency F1 to the source cell that is the current serving cell (step S1010). Then, the UE transmits proxy information regarding a frequency F2 to the source cell (step S1020).

The source cell determines that the UE needs to perform measurement on both the frequency F1 and the frequency F2 on the basis of the proxy information, and sends measurement configurations for the frequency F1 and the frequency F2 to the UE (step S1030).

The UE performs measurement on the frequency F1 and the frequency F2 on the basis of the measurement configurations, and sends to the source cell a measurement report including measurement results on the frequency F1 and the frequency F2 (step S1040). The UE receives system information of CSG cells at the frequency F1 and the frequency F2. IDs of the CSG cells may be included in the measurement report.

The source cell prepares a handover with respect to the target cell (step S1050). The source cell sends to the UE a handover command indicating a handover to the target cell (step S1060). The UE performs the handover with respect to the target cell (step S1070).

Assume that the UE detects CSG cells of a frequency F3 between steps S1060 and S1070. However, since the handover command has already been received, the UE cannot send proxy information regarding the frequency F3 to an old serving cell (i.e., the source cell). In addition, since the handover has not been complete yet, the UE cannot send the proxy information regarding the frequency F3 to a new serving cell (i.e., the target cell).

Therefore, after the handover is complete, the UE can send the proxy information regarding the frequencies F1, F2, and F3 to the new serving cell (step S1080, S1085, and S1090). The new serving cell sends measurement configurations for the frequencies F1, F2, and F3 to the UE (step S1095).

According to the above method, the proxy information which regards to the frequency F1 and the frequency F2 and which is sent to the old serving cell is repetitively retransmitted to the new serving cell. The proxy information regarding the frequency F1 and the frequency F2 is transmitted using individual separate messages. Many radio resources may be required to transmit a plurality of messages.

Figure 11:
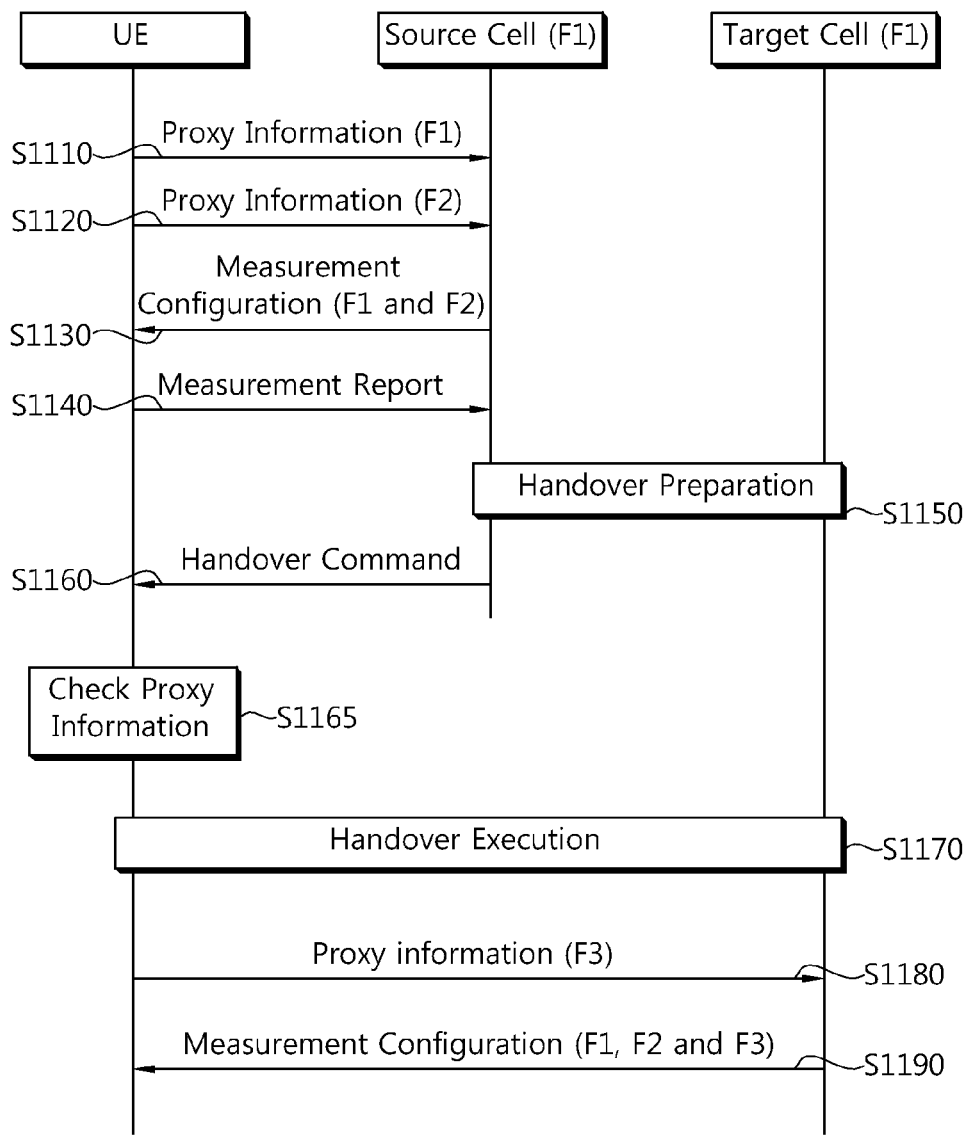
FIG. 11 is a flowchart showing a handover according to an embodiment of the present invention.

FIG. 11 is a flowchart showing a handover according to an embodiment of the present invention.

A UE sends proxy information regarding a frequency F1 to a source cell that is a current serving cell (step S1110). Then, the UE transmits proxy information regarding a frequency F2 to the source cell (step S1120).

The source cell determines that the UE needs to perform measurement on both the frequency F1 and the frequency F2 on the basis of the proxy information, and sends measurement configurations for the frequency F1 and the frequency F2 to the UE (step S1130).

The UE performs measurement on the frequency F1 and the frequency F2 on the basis of the measurement configurations, and sends to the source cell a measurement report including measurement results on the frequency F1 and the frequency F2 (step S1140). The UE receives system information of CSG cells at the frequency F1 and the frequency F2. IDs of the CSG cells may be included in the measurement report. The UE may report a measurement result on member CSG cells to which the UE belongs as a member.

The source cell prepares a handover with respect to the target cell (step S1150). The source cell sends to the UE a handover command indicating a handover to the target cell (step S1160). The UE performs the handover with respect to the target cell (step S1170). The UE sends a handover complete to confirm successful completion of the handover (S1175).

Before or after the handover starts, the UE checks proxy information to be sent to a BS (this proxy information is called additional proxy information) (step S1165).

For example, assume that the UE detects a CSG cell of a frequency F3. After the handover is complete, the UE can send the proxy information regarding the frequency F3 (step S1180). The proxy information can be included in the handover complete. The new serving cell sends measurement configurations on the frequencies F1, F2, and F3 to the UE (step S1190). The information regarding the frequencies F1 and F2 may be provided while the source cell prepares the handover to the target cell.

The UE may use various methods for checking the additional proxy information.

In a first embodiment, the UE may determine whether the additional proxy information exists on the basis of a measurement object included in a handover command. The handover command includes information regarding a measurement object to be measured by the UE. The UE may determine whether the additional proxy information exists by comparing the measurement object currently used by the UE and the measurement object included in the handover command. For example, if the UE considers the frequencies F1, F2, and F3 as the measurement object but the measurement object included in the handover command is only F1 and F2, the UE sends the additional proxy information regarding the frequency F3 to the new serving cell.

In a second embodiment, a proxy identifier may be used. Each piece of proxy information includes the proxy identifier for identifying the proxy information. For example, first proxy information regarding the frequency F1 includes a first proxy identifier, and second proxy information regarding the frequency F2 includes a second proxy identifier. The handover command includes the first and second proxy identifiers. The UE stores the additional proxy information of the new CSG cell if the proxy identifier of the detected CSG cell is different from the first and second proxy identifiers. Therefore, the UE sends to the new serving cell the additional proxy information regarding the frequency F3 which is not identified by the first and second proxy identifiers.

In doing so, there is an advantage in that the additional proxy information of the new CSG cell can be reported to the BS even if the frequency of the CSG cell is equal to the frequency of the macro cell.

In a third embodiment, proxy information generated after a specific time point may be the additional proxy information. For example, after the measurement report of step S1140 is sent to the source cell, the UE stores the proxy information of the CSG cell of the frequency F3. After the handover is complete, the UE may send the additional proxy information regarding the frequency F3 to the new serving cell.

After the handover is complete, the UE determines proxy information which needs to be transmitted to the new serving cell. Therefore, repetitive transmission of unnecessary proxy information is reduced, and only necessary proxy information can be delivered to the BS.

Figure 12:
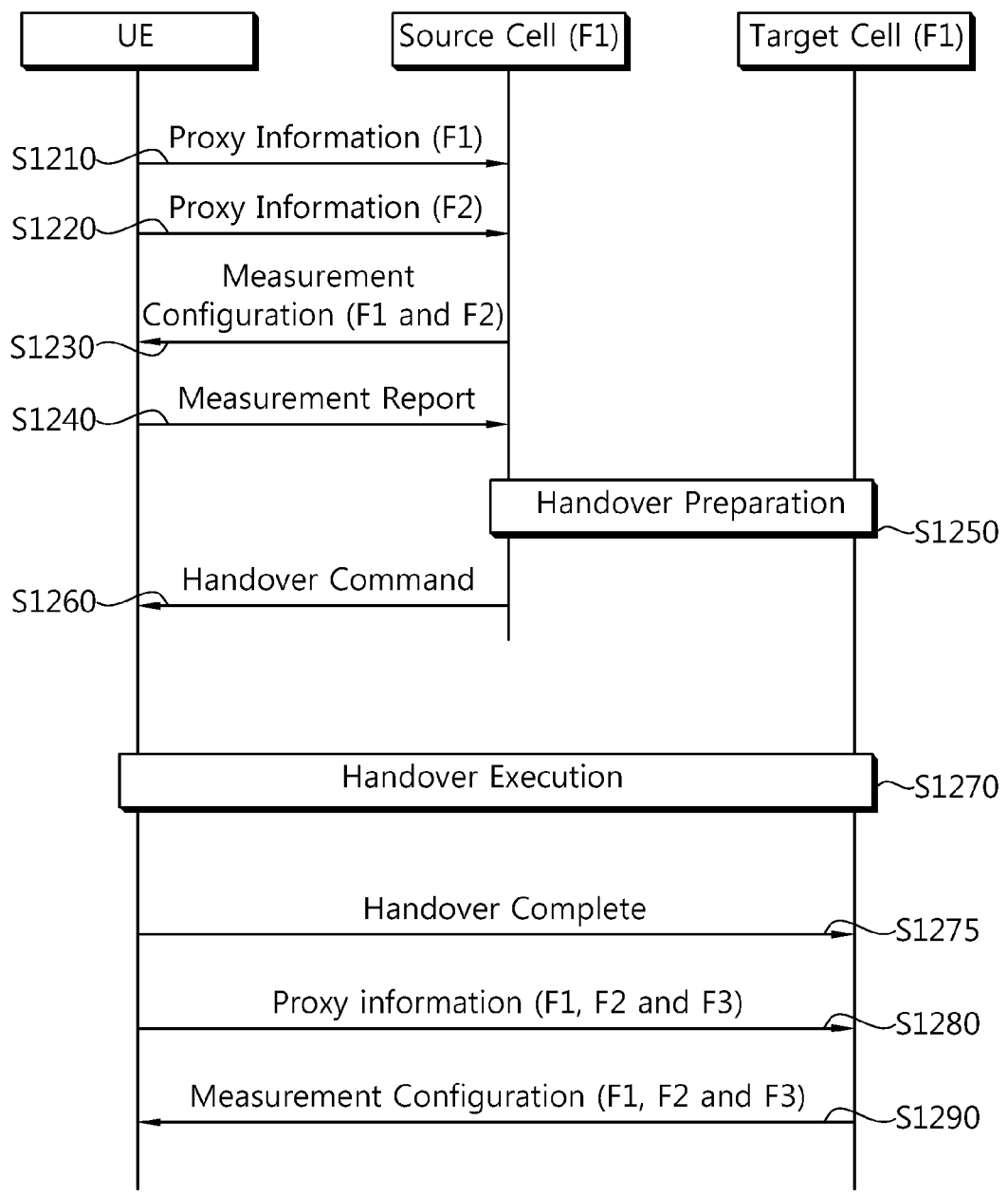
FIG. 12 is a flowchart showing a handover according to an embodiment of the present invention.

FIG. 12 is a flowchart showing a handover according to an embodiment of the present invention.

A UE sends proxy information regarding a frequency F1 to a source cell that is a current serving cell (step S1210). Then, the UE transmits proxy information regarding a frequency F2 to the source cell (step S1220).

The source cell determines that the UE needs to perform measurement on both the frequency F1 and the frequency F2 on the basis of the proxy information, and sends measurement configurations for the frequency F1 and the frequency F2 to the UE (step S1230).

The UE performs measurement on the frequency F1 and the frequency F2 on the basis of the measurement configurations, and sends to the source cell a measurement report including measurement results on the frequency F1 and the frequency F2 (step S1240). The UE receives system information of CSG cells at the frequency F1 and the frequency F2. IDs of the CSG cells may be included in the measurement report. The UE may report a measurement result on member CSG cells to which the UE belongs as a member.

The source cell prepares a handover with respect to the target cell (step S1250). The source cell sends to the UE a handover command indicating a handover to the target cell (step S1260). The UE performs the handover with respect to the target cell (step S1270). The UE sends a handover complete to confirm successful completion of the handover (S1275).

After the handover is complete, the UE may transmit the proxy information regarding the frequencies F1, F2, and F3 by using one message (step S1280). The new serving cell sends measurement configurations for the frequencies F1, F2, and F3 to the UE (step S1290).

The UE transmits the proxy information which regards to the frequencies F1 and F2 and which is transmitted before the handover. The proxy information can be included in the handover complete. Then, proxy information stored after the handover is complete and proxy information of the new CSG cell are transmitted by using one message. Therefore, a radio resource used for transmission of the proxy information can be reduced.

Figure 13:
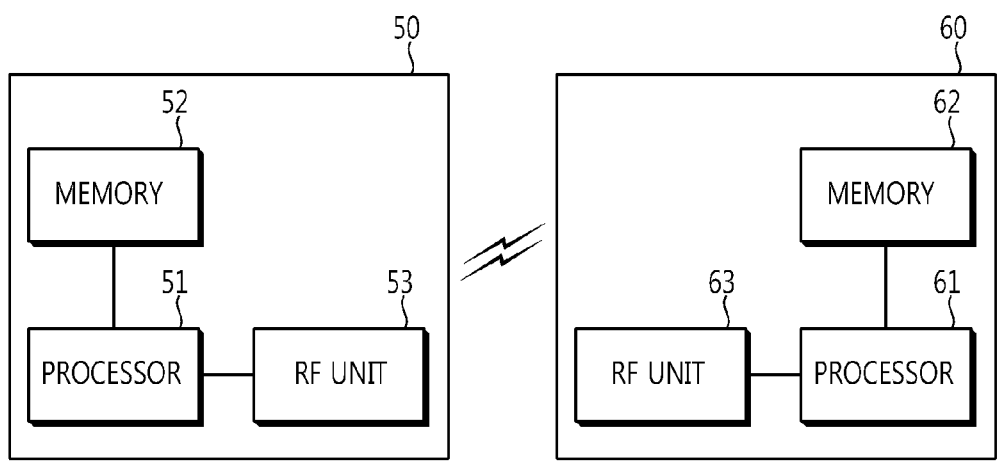
FIG. 13 is a block diagram showing wireless communication system to implement an embodiment of the present invention.

FIG. 13 is a block diagram showing wireless communication system to implement an embodiment of the present invention.

A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may implement operations of a BS in the embodiments in FIG. 11 and FIG. 12.

A UE 60 may include a processor 61, a memory 62 and a RF unit 63. The memory 62 is operatively coupled with the processor 61 and stores a variety of information to operate the processor 61. The RF unit 63 is operatively coupled with the processor 61, and transmits and/or receives a radio signal.

The processor 61 may be configured to implement proposed functions, procedures and/or methods described in this description. Layers of the radio interface protocol may be implemented in the processor 61. The processor 51 may implement operations of a UE in the embodiments in FIG. 11 and FIG. 12.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of performing a handover from a macro cell to a closed subscriber group (CSG) cell in a wireless communication system, the method comprising:

transmitting, by a user equipment to a macro cell, first proxy information which indicates that the user equipment enters an area of a first member CSG cell to which the user equipment previously accessed, the first proxy information comprising first frequency information and a first proxy identifier, the first frequency information indicating a first frequency on which the first member CSG cell is operating, the first proxy identifier identifying the first proxy information;

receiving, by the user equipment from the macro cell, a handover command which commands a handover from the macro cell to a target CSG cell, the handover command comprising a set of received proxy identifiers; and performing, by the user equipment, the handover from the macro cell to the target CSG cell;

wherein if the user equipment enters an area of a second member CSG cell to which the user equipment previously accessed, the method further comprises:

determining, by the user equipment, whether to transmit second proxy information for announcing that an additional frequency to be considered in a handover procedure is detected by comparing a second proxy identifier for a second frequency on which the second member CSG cell is operating with the set of received proxy identifiers in the handover command; and transmitting, by the user equipment to the target CSG cell, the second proxy information after completing the handover if the second proxy identifier is not included in the set of received proxy identifiers, the second proxy information indicating that the user equipment enters the area of the second member CSG cell, the second proxy information comprising second frequency information and the second proxy identifier, the second frequency information indicating the second frequency as the additional frequency, the second proxy identifier identifying the second proxy information.

2. The method of claim 1, further comprising:

transmitting, by the user equipment to the macro cell, a measurement report which includes a measurement result of the first member CSG cell and an identity of the first member CSG cell.

3. The method of claim 2, wherein determining whether to transmit the second proxy information is performed after transmitting the measurement report.

4. The method of claim 2, wherein the identity of the first member CSG cell is determined based on system information received from the first member CSG cell.

5. The method of claim 2, wherein the identity of the first member CSG cell includes a first CSG identity and a physical cell identity.

6. The method of claim 2, wherein the measurement report includes the proxy identifier identifying the first proxy information.

7. The method of claim 2, further comprising:

receiving, by the user equipment from the macro cell, a measurement configuration including a measurement object indicating the first frequency.

8. The method of claim 7, further comprising:

receiving, by the user equipment from the target CSG cell, a measurement configuration including a measurement object indicating the first frequency.

9. An apparatus of performing a handover from a macro cell to a closed subscriber group (CSG) cell in a wireless communication system, the apparatus comprising:

a radio frequency unit configured for receiving and transmitting radio signals; and a processor operatively coupled with the radio frequency unit and configured for:

transmitting, to a macro cell, first proxy information which indicates that the apparatus enters an area of a first member CSG cell to which the apparatus previously accessed, the first proxy information comprising first frequency information and a first proxy identifier, the first frequency information indicating a first frequency on which the first member CSG cell is operating, the first proxy identifier identifying the first proxy information;

receiving, from the macro cell, a handover command which commands a handover from the macro cell to a target CSG cell, the handover command comprising a set of received proxy identifiers; and performing the handover from the macro cell to the target CSG cell;

wherein if the apparatus enters an area of a second member CSG cell to which the apparatus previously accessed, the processor is further configured for:

determining whether to transmit second proxy information for announcing that an additional frequency to be considered in a handover procedure is detected by comparing a second proxy identifier for a second frequency on which the second member CSG cell is operating with the set of received proxy identifiers in the handover command; and transmitting, to the target CSG cell, the second proxy information after completing the handover if the second proxy identifier is not included in the set of received proxy identifiers, the second proxy information indicating that the apparatus enters the area of the second member CSG cell, the second proxy information comprising second frequency information and the second proxy identifier, the second frequency information indicating the second frequency as the additional frequency, the second proxy identifier identifying the second proxy information.

10. The apparatus of claim 9, wherein the processor is configured for:

transmitting, to the macro cell, a measurement report which includes a measurement result of the first member CSG cell and an identity of the first member CSG cell.

11. The apparatus of claim 10, wherein the processor is further configured for determining whether to transmit the second proxy information after transmitting the measurement report.

12. The apparatus of claim 10, wherein the identity of the first member CSG cell is determined based on system information received from the first member CSG cell.

* * * * *